US011531874B2

(12) United States Patent
Ioffe

(10) Patent No.: US 11,531,874 B2
(45) Date of Patent: Dec. 20, 2022

(54) REGULARIZING MACHINE LEARNING MODELS

(71) Applicant: Google LLC, Mountain View, CA (US)

(72) Inventor: Sergey Ioffe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 835 days.

(21) Appl. No.: 15/343,458

(22) Filed: Nov. 4, 2016

(65) Prior Publication Data

US 2017/0132512 A1    May 11, 2017

Related U.S. Application Data

(60) Provisional application No. 62/252,374, filed on Nov. 6, 2015.

(51) Int. Cl.
  *G06N 3/08*  (2006.01)
  *G06N 3/04*  (2006.01)
  *G06K 9/62*  (2022.01)
  *G06V 10/44* (2022.01)

(52) U.S. Cl.
  CPC .............. *G06N 3/08* (2013.01); *G06K 9/6256* (2013.01); *G06K 9/6272* (2013.01); *G06N 3/04* (2013.01); *G06V 10/454* (2022.01)

(58) Field of Classification Search
  CPC ............ G06N 20/00; G06N 3/08; G06N 3/04; G06K 9/4628; G06K 9/6272
  See application file for complete search history.

(56) References Cited

U.S. PATENT DOCUMENTS

| 7,552,098 B1 * | 6/2009 | Haffner ................. G10L 15/063 |
| | | 706/20 |
| 7,587,373 B2 | 9/2009 | Smith, Jr. et al. |
| 7,613,665 B2 | 11/2009 | Chen et al. |
| 8,065,244 B2 | 11/2011 | Chen et al. |
| 8,296,249 B2 * | 10/2012 | Iwakura ................. G06N 5/025 |
| | | 706/12 |

(Continued)

OTHER PUBLICATIONS

Zheng et al., A Novel Contrast to Co-Learning Framework for Generating High Quality Training Data, IEEE Int'l Conference on Data Mining, pp. 649-658 (2010) (Year: 2010).*

(Continued)

*Primary Examiner* — Kakali Chaki
*Assistant Examiner* — Kevin L. Smith
(74) *Attorney, Agent, or Firm* — Fish & Richardson P.C.

(57) ABSTRACT

Methods, systems, and apparatus, including computer programs encoded on computer storage medium, for training a neural network, wherein the neural network is configured to receive an input data item and to process the input data item to generate a respective score for each label in a predetermined set of multiple labels. The method includes actions of obtaining a set of training data that includes a plurality of training items, wherein each training item is associated with a respective label from the predetermined set of multiple labels; and modifying the training data to generate regularizing training data, comprising: for each training item, determining whether to modify the label associated with the training item, and changing the label associated with the training item to a different label from the predetermined set of labels, and training the neural network on the regularizing data.

24 Claims, 5 Drawing Sheets

(56) References Cited

U.S. PATENT DOCUMENTS

| | | | | |
|---|---|---|---|---|
| 8,620,838 | B1* | 12/2013 | Moore | G06N 20/00 706/12 |
| 8,830,788 | B2 | 9/2014 | Xia et al. | |
| 9,329,288 | B2 | 5/2016 | Jin et al. | |
| 2003/0225719 | A1* | 12/2003 | Juang | G06K 9/6255 706/48 |
| 2009/0240637 | A1* | 9/2009 | Drissi | G06Q 10/10 706/12 |
| 2013/0254153 | A1* | 9/2013 | Marcheret | G06N 7/00 706/59 |

OTHER PUBLICATIONS

Yann Ollivier, Persistent Contextual Neural Networks for Learning Symbolic Data Sequences, 2013 (Year: 2013).*

Hua et al., "Noise-Injected Neural Networks Show Promise for use on Small-Sample Expression Data," BMC Informatics (2006) (Year: 2006).*

Miyato et al., "Distributional Smoothing with Virtual Adversarial Training," JMLR (Aug. 2015) (Year: 2015).*

International Preliminary Report on Patentability issued in International Application No. PCT/US2016/060545, dated May 17, 2018, 10 pages.

Hinton et al. "Distilling the knowledge in a neural network," arXiv preprint arXiv1503.02531v1, Mar. 9, 2015, 9 pages.

International Search Report and Written Opinion in International Application No. PCT/US2016/060545, dated Mar. 9, 2017, 14 pages.

Reed et al. "Training deep neural networks on noisy labels with bootstrapping," arXiv preprint arXiv1412.6596v3, Apr. 15, 2015, 11 pages.

Sukhbaatar et al. "Learning from noisy labels with deep neural networks," arXiv preprint arXiv1406.2080v1, Jun. 9, 2014, 10 pages.

Tzeng et al. "Simultaneous deep transfer across domains and tasks," arXiv preprint arXiv1510.02192v1, Oct. 8, 2015, 9 pages.

EP Office Action in European Application No. 16809564.4, dated Jun. 30, 2021, 8 pages.

Jin et al, "A New Boosting Algorithm Using Input-Dependent Regularized" ICML-2003, 2003, 9 pages.

* cited by examiner

REGULARIZING MACHINE LEARNING MODELS

CROSS-REFERENCE TO RELATED APPLICATION

This application claims the benefit of the U.S. Provisional Application No. 62/252,374 filed Nov. 6, 2015 and entitled "Regularizing Machine Learning Models," which is hereby incorporated by reference in its entirety.

BACKGROUND

This specification relates to training neural networks.

Neural networks are machine learning models that employ one or more layers of models to generate an output, e.g., a classification, for a received input. Some neural networks include one or more hidden layers in addition to an output layer. The output of each hidden layer is used as an input to the next layer, i.e., the next hidden layer or the output layer of the network. Each layer of the network generates an output from the received input in accordance with current values of a respective set of parameters.

A neural network may overfit on training data. Overfitting may be described as the neural network becoming overly confident in view of a particular set of training data. When a neural network is overfitted, it may begin to make poor generalizations with respect to items that are not in the training data.

SUMMARY

Aspects of the present disclosure are directed towards improving the performance of a trained neural network by reducing overfitting.

According to one innovative aspect of the present disclosure, a method of training a neural network is described, wherein the neural network is configured to receive an input data item and to process the input data item to generate a respective score for each label in a predetermined set of multiple labels. The method may include the actions of obtaining a set of training data that includes a plurality of training items, wherein each training item is associated with a respective label from the predetermined set of multiple labels and modifying the training data to generate regularizing training data that regularizes the training of the neural network. The action of modifying may include, for each training item, determining whether or not to modify the label associated with the training item, and in response to determining to modify the label associated with the training item, changing the label associated with the training item to a different label from the predetermined set of labels, and training the neural network on the regularizing data.

In accordance with various innovative aspects of the disclosure, overfitting may be reduced by using a regularizing data set to train the neural network, thereby to improve the performance of the trained neural network. The regularizing data set may be generated by introducing a predetermined amount of noise into the labels of a training data set, for example, by modifying one or more labels associated with training data items in the training data set. The training data items may comprise training images.

Other aspects include corresponding systems, apparatus, and computer programs to perform the actions of methods, encoded on computer storage devices. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by a data processing apparatus, cause the apparatus to perform the operations or actions.

These and other aspects may optionally include one or more of the following features. For instance, in some implementations, changing the label associated with a training item to a different label from the predetermined set of labels includes changing the label from a label that correctly describes the training item to a label that incorrectly describes the training item. In some implementations, the different label is randomly selected from the predetermined set of labels.

In some implementations, the label may include a training label distribution that includes a score for the training item for each label in a predetermined set of labels associated with a set of training images. In such implementations, changing the label associated with the training item to a different label from the predetermined set of labels may include changing the distribution of scores in a training data item's training label distribution from a distribution of scores representing a correct label to a distribution of scores representing an incorrect label.

In some implementations, determining whether or not to modify the label associated with the training item may be based on a predetermined probability. In some such implementation, the predetermined probability may be 10%.

According to another innovative aspect of the present disclosure, a method of training a neural network is described, wherein the neural network is configured to receive an input data item and to process the input data item to generate a respective score for each label in a predetermined set of multiple labels. The method may include actions of obtaining a set of training data that includes a plurality of training items, wherein each training item is associated with an initial target label distribution that assigns a respective target score to each label in the predetermined set of labels, modifying the training data to generate regularizing training data that regularizes the training of the neural network, comprising, for each training item, modifying the initial target label distribution to generate a modified target label distribution by combining the initial target label distribution with a smoothing label distribution, and training the neural network on the regularizing training data.

Other aspects include corresponding systems, apparatus, and computer programs to perform the actions of methods, encoded on computer storage devices.

These and other aspects may optionally include one or more of the following features. For instance, in some implementations, combining the initial target label distribution with a smoothing label distribution may include calculating a weighted sum of the initial target label distribution and the smoothing label distribution.

In some implementations, the target score for a known label for the training item may be assigned a predetermined positive value in the initial target distribution for the training item, and the target score for each label other than the known label may be set to 0 in the initial target distribution.

In some implementations, the smoothing label distribution may include a respective smoothing score for each label in the predetermined set of labels, and each smoothing score may be the same predetermined value.

In some implementations, the smoothing label distribution may include a respective smoothing score for each label in the predetermined set of labels, and the smoothing scores may be non-uniform.

According to another innovative aspect of the present disclosure, a method of training a neural network is provided, wherein the neural network is configured to receive an input data item and to process the input data item to generate a respective score for each label in a predetermined set of multiple labels. The method may include actions of receiving a request to train the neural network to optimize a loss function comprising a first error term, and training the neural network to optimize a regularizing loss function, the regularizing loss function comprising the first error term and a regularizing error term that penalizes the neural network based on the error between a predicted distribution and a smoothing distribution.

Other aspects include corresponding systems, apparatus, and computer programs to perform the actions of methods, encoded on computer storage devices.

These and other aspects may optionally include one or more of the following features. For instance, in some implementations, the smoothing distribution may be a uniform distribution. Alternatively, the smoothing distribution may be a distribution that was used prior to the predicted distribution. In some implementations, the predicted distribution may include a set of scores generated by the neural network for a particular input.

The subject matter described in this specification can be implemented in particular embodiments so as to realize one or more of the following advantages. The accuracy of inferences generated by trained a neural network can be improved. In particular, by modifying labels associated with training data used to train the neural network, the neural network can be discouraged from overfitting on the training data, i.e., from becoming overly reliant, and overconfident, in making inferences based on information learned by the neural network during training, thereby improving performance of the neural network on new inputs after training.

The details of these, and other, implementations are set forth in the accompanying drawings and the description below. Other features and advantages will be apparent from the description and drawings, and from the claims.

DETAILED DESCRIPTION

This specification describes how a system implemented as computer programs on one or more computers in one or more locations can regularize the training of a neural network by generating a set of regularizing training data. The neural network is configured to receive an input data item and to process the input data item to generate a respective score for each label in a predetermined set of multiple labels.

The system can receive a training data set for training the neural network that includes a set of multiple training items. Each training item in the set of multiple training items may be associated with a respective training label distribution that associates a respective score with each label of the set of labels. Then, the neural network may be iteratively trained by optimizing a specified objective function that takes as input a neural network output generated by the neural network for a neural network input and a target output for the neural network input.

Figure 1:
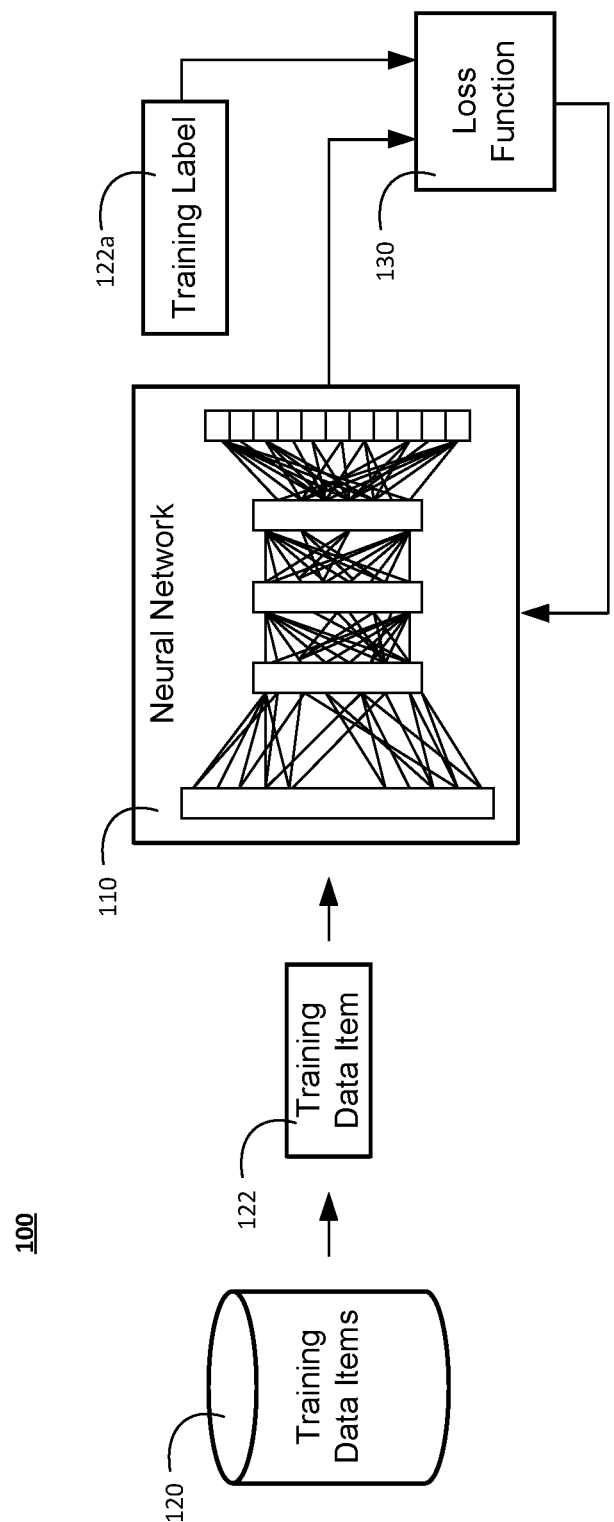
FIG. 1 is a block diagram of an example of a system for training a neural network.

FIG. 1 is a block diagram of an example of a neural network training system 100 for training a neural network 110. The neural network training system 100 is an example of a system implemented as computer programs on one or more computers in one or more locations, in which the systems, components, and techniques described below can be implemented. The neural network training system 100 includes a neural network 110 and a database 120 of training data items.

The neural network 110 is configured to receive an input data item and to process the input data item to generate a respective score for each label in a predetermined set of multiple labels.

The neural network 110 can be configured to receive any kind of digital data input and to generate any kind of score or classification output based on the input. For example, if the inputs to the neural network 110 are images or features that have been extracted from images, the output generated by the neural network 110 for a given image may be scores for each of a set of object categories, with each score representing an estimated likelihood that the image contains an image of an object belonging to the category.

As another example, if the inputs to the neural network 110 are Internet resources (e.g., web pages), documents, or portions of documents or features extracted from Internet resources, documents, or portions of documents, the output generated by the neural network 110 for a given Internet resource, document, or portion of a document may be a score for each of a set of topics, with each score representing an estimated likelihood that the Internet resource, document, or document portion is about the topic.

As another example, if the inputs to the neural network 110 are features of a personalized recommendation for a user, e.g., features characterizing the context for the recommendation, e.g., features characterizing previous actions taken by the user, the output generated by the neural network 110 may be a score for each of a set of content items, with each score representing an estimated likelihood that the user will respond favorably to being recommended the content item. In some of these examples, the neural network 110 is part of a reinforcement learning system that provides content recommendations to users.

As another example, if the input to the neural network 110 is text in one language, the output generated by the neural network 110 may be a score for each of a set of pieces of text in another language, with each score representing an estimated likelihood that the piece of text in the other language is a proper translation of the input text into the other language.

As another example, if the input to the neural network 110 is features of a spoken utterance, the output generated by the neural network 110 may be a score for each of a set of pieces of text, each score representing an estimated likelihood that the piece of text is the correct transcript for the spoken utterance.

To allow the neural network 110 to generate accurate outputs for received data items, the neural network training system 100 trains the neural network 110 to adjust the values of the parameters of the neural network 110, e.g., to determine trained values of the parameters from initial values.

In training the neural network 110, the neural network training system 100 uses training items from the database 120 of labeled training items. The database 120 stores a set of multiple training items, with each training item in the set of multiple training items being associated with a respective label. Generally, the label for the training item identifies one or more correct labels for the training item, i.e., the label or labels that should be identified as the label or labels of the training item by the scores generated by the neural network 110. In some implementations, the label data for a given training item is a score distribution that includes a respective score for each label in the set of labels, with the scores reflecting the correct label or labels for the training item. For example, a training data item 122 may be associated with a training label 122a.

In particular, the neural network training system 100 trains the neural network 110 to minimize a loss function 130. Generally, the loss function 130 is a function that depends on the (i) network output generated by the neural network 110 by processing a given training item and (ii) the label for the training item, i.e., the target output that the neural network 110 should have generated by processing the training item.

The neural network training system 100 can train the neural network 110 to minimize the loss function 130 by performing multiple iterations of a conventional neural network training technique on training items from the database 120, e.g., stochastic gradient descent with backpropagation, to iteratively adjust the values of the parameters of the neural network 110.

In order to reduce overfitting and to improve the performance of the trained neural network, the neural network training system 100 regularizes the training of the neural network 110 by either (i) modifying the label data for the training items prior to using the training items to train the neural network 110 or (ii) modifying the loss function 130 that is used to train the neural network 110. Modifying the label data is described below with reference to FIGS. 2-4 while modifying the loss function is described below with reference to FIG. 5.

Figure 2:
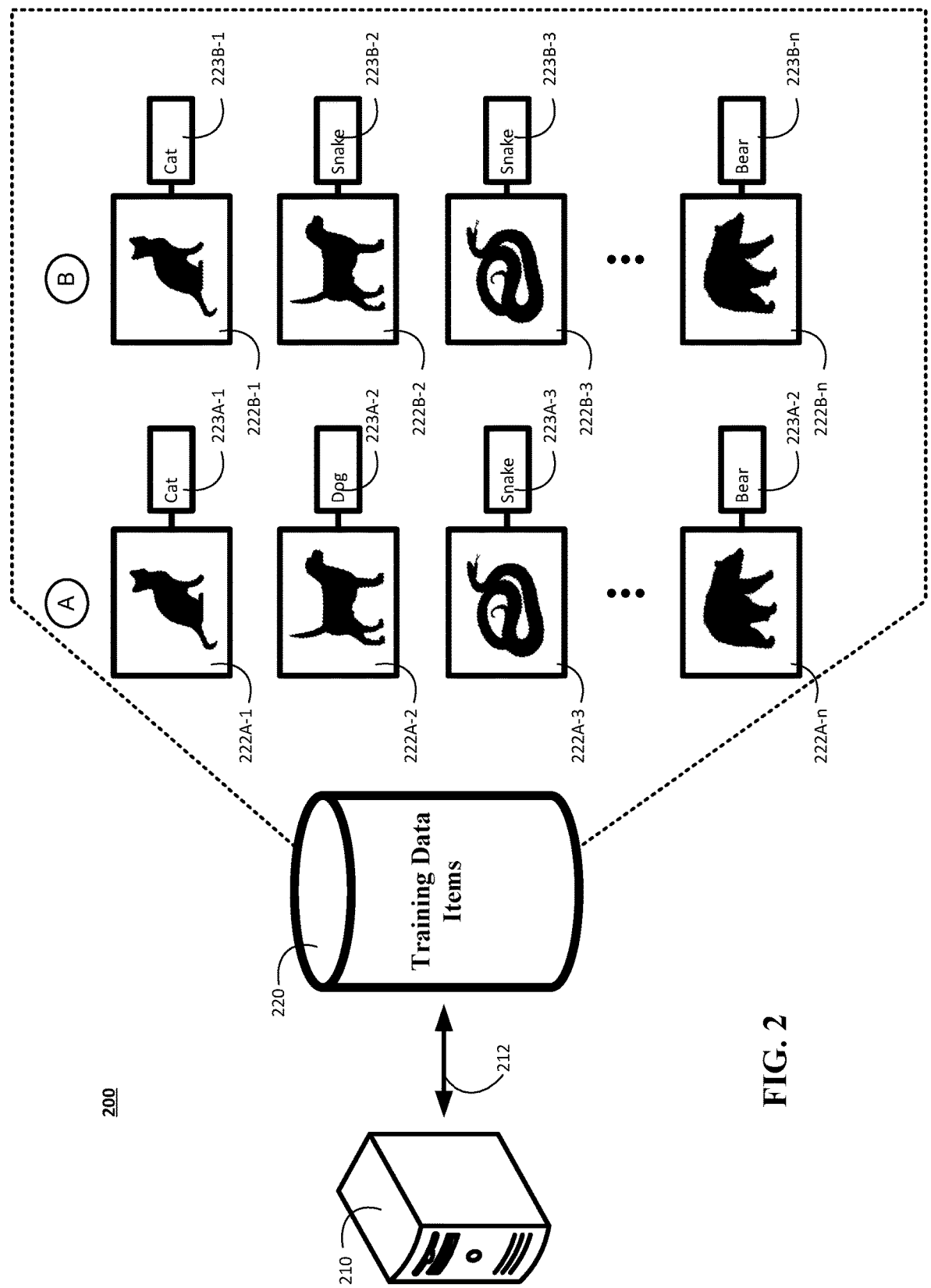
FIG. 2 is a contextual diagram of an example of a system that generates a regularizing set of training data.

FIG. 2 is a contextual diagram of an example of a system 200 that generates a regularizing set of training data. The system includes a neural network training system 210 and a database 220 of training data items.

At stage A, a set of training data items stored in the database 220 of training data items includes a set of n training images 222A-1, 222A-2, 222A-3, 222A-n, where n is any positive integer. Each image in the set of training images is associated with a label 223A-1, 223A-2, 223A-3, 223A-n that describes a classification associated with each respective training image 222A-1, 222A-2, 222A-3, 222A-n. For example, the training image 222A-1 is labeled as a "cat" 223A-1, the training image 222A-2 is labeled as a "dog" 223A-2, the training image 222A-3 is labeled as a "snake" 223A-3, and the training image 222A-n is labeled as a "bear" 223A-n. For ease of description, the labels 223A-1, 223A-2, 223A-3, 223A-n associated with each training image 222A-1, 222A-2, 222A-3, 222A-n are shown and described as English words. However, when implemented, each label may be a score distribution that identifies the English word.

For example, a predetermined set of labels associated with the set of training data images at stage A may include "cat," "dog," "snake," and "bear." Accordingly, by way of example, a training image such as training image 222A-1 may have a training label distribution of "0.6," "0.2," "0.1," "0.2" for the set of labels "cat," "dog," "snake," and "bear," respectively.

In some implementations, a training label distribution of "0.6," "0.2," "0.1," "0.2" for the set of labels "cat," "dog," "snake," and "bear," respectively may indicate that the training image 222A-1 is labeled as a "cat" because the highest score of the training label distribution corresponds to the category "cat." Alternatively, a training label distribution may be a one-hot distribution. In such as distribution, the value assigned to the correct label is a positive value such as "1" and all other labels are assigned a value such as "0." Accordingly, a one-hot training label distribution of "1," "0," "0," "0" for the set of labels "cat," "dog," "snake," and "bear," respectively, may indicate that the image 222A-1 is classified as a cat.

In some implementations, a neural network that is trained using the training data provided at stage A may be prone to overfitting. In such instances, a neural network may begin to process training data accurately, and become overconfident. However, when a neural network is overfitted, it may begin to make poor generalizations with respect to images that are not in the training data. For instance, the neural network may begin to classify images as cats after it has been trained that are not cats even though the neural network accurately classified an entire set of labeled training data items. Aspects of the present disclosure seek to reduce overfitting by using a regularizing training data set to train a neural network. A regularizing training data set may be generated by modifying one or more labels associated with training data items in a training data set used to train a neural network.

Generally, the regularizing training data set may be generated by introducing a predetermined amount of noise into the labels of a training data set. For instance, the neural network training system 210 may process 212 a training data set at stage A and determine whether or not to modify a label 223A-1, 223A-2, 223A-3, 223A-n associated with a particular training data item such as training image 222A-1, 222A-2, 222A-3, 222A-n. In some implementations, the neural network training system 210 may randomly determine whether or not to modify a label 223A-1, 223A-2, 223A-3, 223A-n associated with a particular training data item such as a training image 222A-1, 222A-2, 222A-3, 222A-n. Alternatively, the neural network training system 210 may determine to modify a label 223A-1, 223A-2, 223A-3, 223A-n associated with a particular training data item such as a training image 222A-1, 222A-2, 222A-3, 222A-n a predetermined probability of the time. For example, the neural network training system 210 may determine to modify a label 223A-1, 223A-2, 223A-3, 223A-n associated with a particular training data item such as a training image 222A-1, 222A-2, 222A-3, 222A-n 10 percent of the time, 20 percent of the time, 30 percent of the time, or the like.

In some implementations, modifying the label 223A-1, 223A-2, 223A-3, 223A-n associated with a particular training data item such as a training image 222A-1, 222A-2, 222A-3, 222A-n may include changing the label 223A-1, 223A-2, 223A-3, 223A-n associated with a particular training data item such as a training image 222A-1, 222A-2, 222A-3, 222A-n from a correct label to an incorrect label. Modifying the label may include, for example, changing the distribution of scores in a training data item's training label distribution from a distribution of scores representing a correct label to a distribution of scores representing an incorrect label. Alternatively, modifying the label may include, for example, changing the distribution of scores in a training data item's training label distribution to reduce the label's identification with a particular class. For example, changing the distribution of scores in a training data item's training label distribution may include, for example, reducing the highest score in a training label distribution by a predetermined amount. Similarly, changing the distribution of scores in a training data item's training label distribution may include, for example, increasing one or more of the lowest scores in the training label distribution by a predetermined amount. The resulting training data set may be referred to as a regularizing data set.

With reference to the example of FIG. 2, the neural network training system 210 may obtain the set of training images shown at stage A. The neural network training system 210 may process 212 the set of training images shown at stage A, and determine whether or not to modify the label 223A-1, 223A-2, 223A-n associated with each respective training image 222A-1, 222A-2, 222A-3, 222A-n. In the example of FIG. 2, the neural network training system 210 may randomly determine to modify the label associated with the training image 222A-2 from the label "dog" to the label "snake" 223B-2. Though the training image 222A-2 is correctly labeled as a "dog," the neural network training system 210 modifies the label 223A-2 so that the image 222A-2, 222B-2 is now incorrectly labeled as a "snake" 223B-2 at stage B. This modification results in a regularizing set of training images shown at stage B.

A neural network may then be trained using the regularizing training images shown at stage B. Training a neural network using the regularizing training images shown at stage B helps the neural network to become less reliant on the training data and produce better generalizations in view of processed training data.

Alternatively, a label modification process referred to as label smoothing may be employed. Assume, for example, a distribution over labels u(k), independent of the training example x, and a smoothing parameter E. For a training example with correct label y, the neural network training system 210 can replace the label distribution $q(k|x)=\delta_{k,y}$, where $\delta_{k,y}$ is the Dirac delta which equals 1 for k=y and 0 when k is not equal to y, with:

$$q'(k|x)=(1-\epsilon)\delta_{k,y}+\epsilon u(k)$$

Thus, the new label distribution q' is a mixture of the original ground-truth distribution q(k|x) and fixed distribution u(k), with weights 1−ϵ and ϵ, respectively. This can be seen as the distribution of the label k obtained by first setting k to the ground-truth label k=y, and then using neural network training system 210 to, with probability E, replace k with a sample drawn from the fixed distribution u(k).

In some implementations, a uniform distribution may be used by assigning u(k)=1/K, where K is the number of labels, to achieve label smoothing regularization, so that $$q'(k) = (1-\epsilon)\delta k, y + \frac{\epsilon}{K}.$$

The example of FIG. 2 provided an example of a single label of a single training data item that was randomly modified. However, the present disclosure need not be so limited. In some implementations, multiple labels may be modified. Moreover, in some implementations, some, or all, of the labels may be modified via smoothing using the label smoothing process described above to create a regularizing set of training data.

Figure 3:
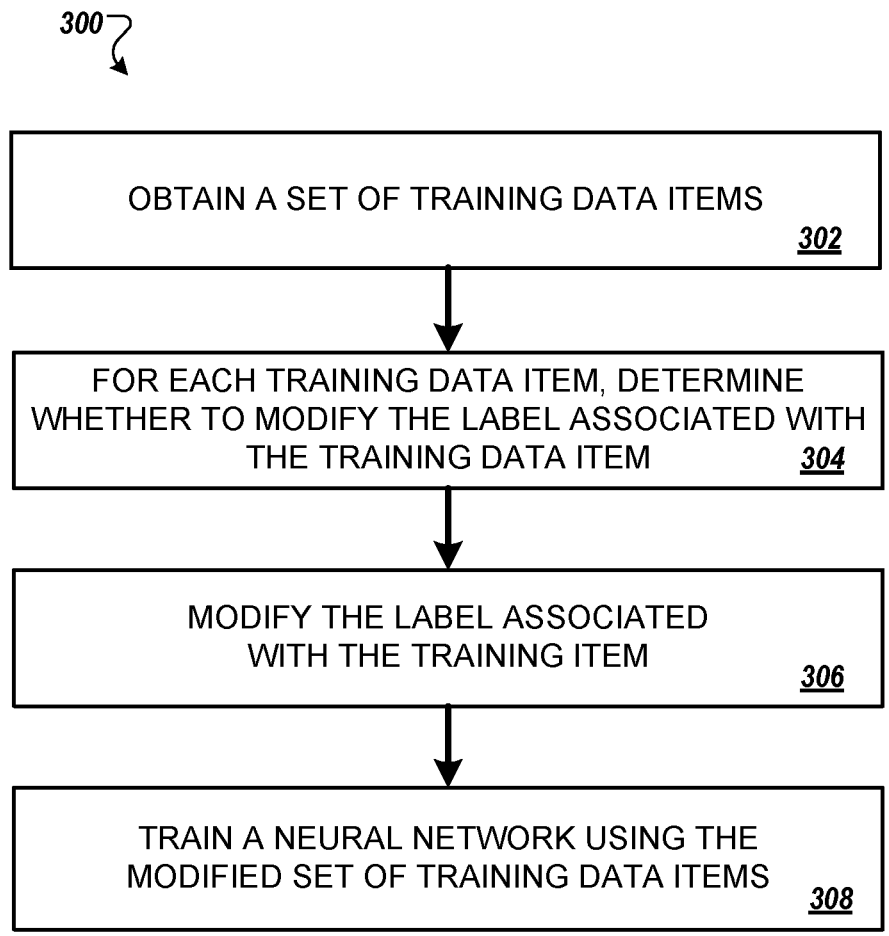
FIG. 3 is a flowchart of an example process for generating a regularizing set of training data.

FIG. 3 is a flowchart of a process 300 for generating a regularizing set of training data. For convenience, the process 300 will be described as being performed by a system of one or more computers located in one or more locations. For example, a neural network training system, e.g., the neural network training system 100 of FIG. 1, appropriately programmed in accordance with this specification, can perform the process 300.

At stage 302, the system obtains a set of training data from a database of training data items. The set of training data may include multiple training data items. The training data items may include an item of content or a set of one or more features that were extracted from the item of content. Each training data item in the set of training data items is associated with a respective label from a predetermined set of multiple labels. The label may include a training label distribution that includes a score for the training image for each label in a predetermined set of labels associated with a set of training images.

At stage 304, the system determines whether to modify the training data to generate regularizing training data that regularizes the training of the neural network. For each training data item in the set of training data items, the system determines whether or not to modify the label associated with the training item. Determining whether or not to modify the label associated with the training item may include, for example, randomly determining to modify a label associated with a particular training data item. Alternatively, the system may determine, with a predetermined probability, to modify a label associated with a particular training data item. For example, the system may determine to modify a label associated with a particular training data item such as a training image 10 percent of the time, 20 percent of the time, 30 percent of the time, or the like.

At stage 306, when the system determines to modify the label associated with the training item, the system modifies the label associated with the training data item by changing the label associated with the training item to a different label that is selected from the predetermined set of labels. In some implementations, modifying the label associated with a particular training data item may include changing the label associated with a particular training data item from a correct label to an incorrect label. Changing the label may include, for example, changing the distribution of scores in a training data item's training label distribution from a distribution of scores representing a correct label to a distribution of scores representing an incorrect label. Alternatively, modifying the label may include, for example, changing the distribution of scores in a training data item's training label distribution to reduce the label's identification with a particular class. For example, changing the distribution of scores in a training data item's training label distribution may include, for example, reducing the highest score in a training label distribution by a predetermined amount. Similarly, for example, changing the distribution of scores in a training data item's training label distribution may include, for example, increasing one or more of the lowest scores in the training label distribution by a predetermined amount. The resulting training data set may be referred to as a regularizing training data set.

At stage 308, the system trains a neural network using the regularizing training data set. Such training may be performed as described with reference to FIG. 1. However, instead of using the database 120 of training data items described with reference to FIG. 1, the training of stage 308 would train a neural network using the regularizing training data set generated using the process of stages 302, 304, and 306 respectively.

Figure 4:
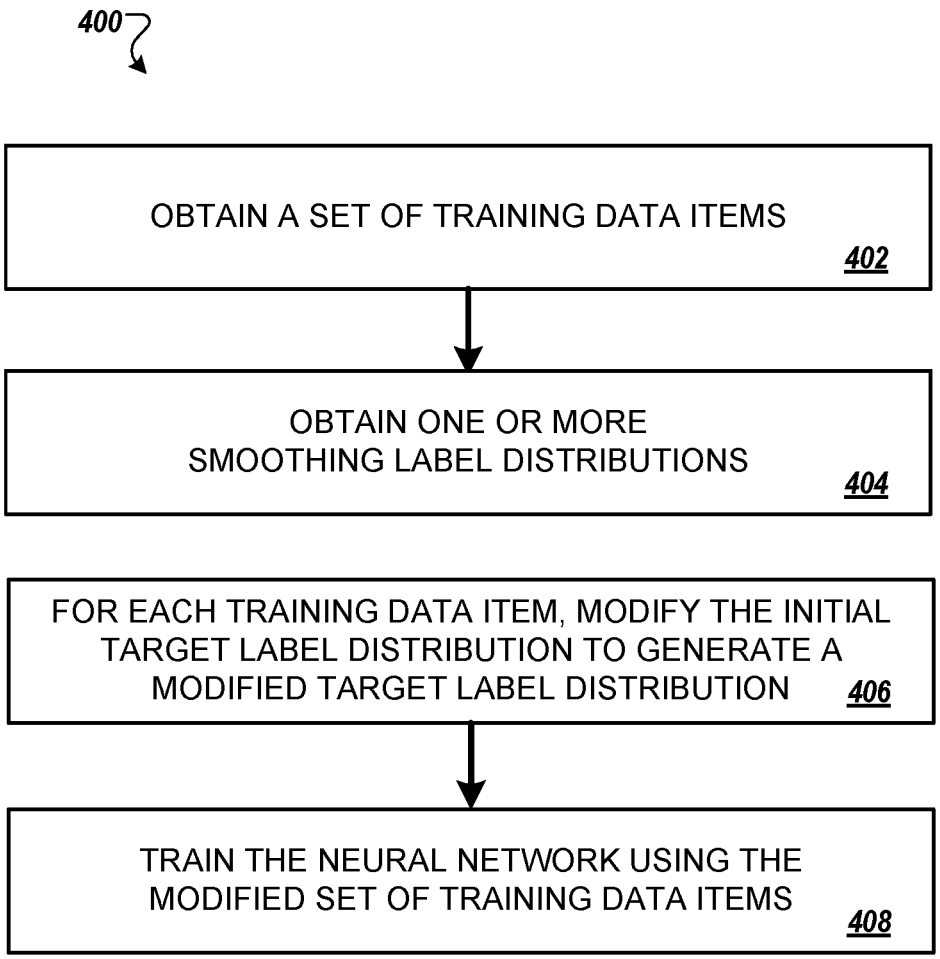
FIG. 4 is a flowchart of another example process for generating a regularizing set of training data.

FIG. 4 is a flowchart of another process 400 for generating a regularizing set of training data. For convenience, the process 400 will be described as being performed by a system of one or more computers located in one or more locations. For example, a neural network training system, e.g., the neural network training system 100 of FIG. 1, appropriately programmed in accordance with this specification, can perform the process 400.

At stage 402, the system obtains a set of training data from a database of training data items. Each training data item in the set of training data items is associated with an initial target label distribution.

At stage 404, the system obtains data identifying a smoothing label distribution. The smoothing label distribution may include a smoothing score for each label in the smoothing label distribution. In some implementations, the smoothing label distribution may be a uniform distribution that assigns the same smoothing score to each label of the smoothing label distribution as described above. Alternatively, in other implementations, the smoothing label distribution may be a non-uniform distribution that includes one or more smoothing scores that are capable of being different from one or more other smoothing scores in the same smoothing label distribution.

At stage 406, the system modifies the training data to generate regularizing training data that can regularize the training of the neural network. In some implementations, modifying the training data includes, for each training data item in the set of training data items obtained at stage 402, combining the initial training distribution with the smoothing label distribution to generate a modified target label distribution. Combining the initial training distribution with the smoothing label distribution may include, for example, calculating a weighted sum of the initial target label distribution and the smoothing label distribution. The resulting training data set may be referred to as a regularizing training data set.

At stage 408, the system trains a neural network using the regularizing training data set that includes training data with labels that have been modified using the smoothing label distribution as described at stage 406. Such training may be performed as described with reference to FIG. 1. However, instead of using the database 120 of training data items described with reference to FIG. 1, the training of stage 408 would train a neural network using the regularizing training data set generated using the process of stages 402, 404, and 406 respectively.

Figure 5:
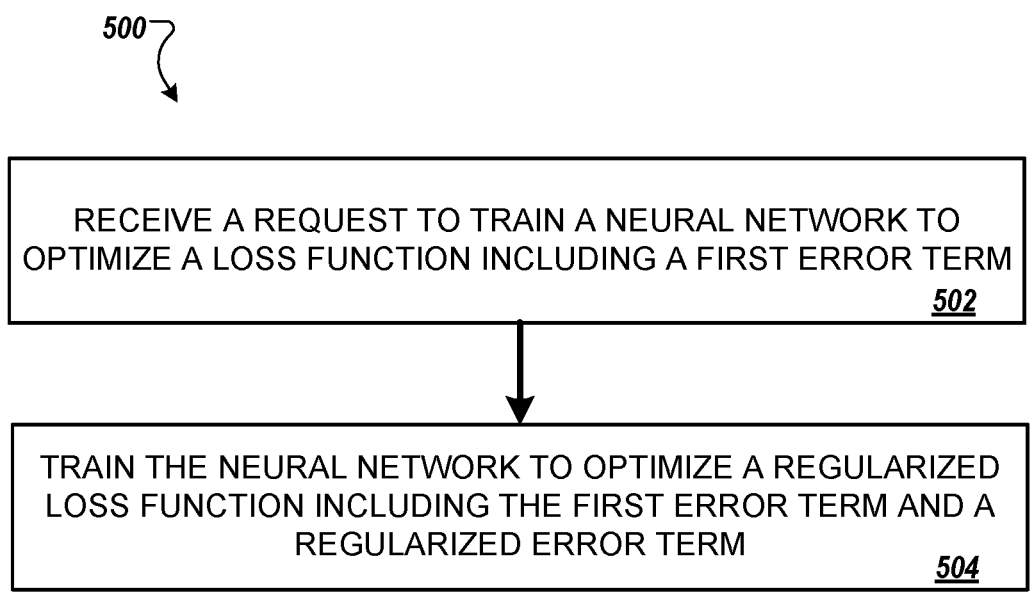
FIG. 5 is a flowchart of an example process for optimizing a loss function using a regularizing error term.

FIG. 5 is a flowchart of a process 500 for minimizing a loss function having a regularizing error term. For convenience, the process 500 will be described as being performed by a system of one or more computers located in one or more locations. For example, a system, e.g., the neural network training system 100 of FIG. 1, appropriately programmed in accordance with this specification, can perform the process 500.

At stage 502, the system receives a request to train a neural network to optimize a loss function that includes a first error term. In one example, the first error term may be a cross-entropy loss. The cross-entropy loss may be defined as:

$$H(q,p) = -\Sigma_{K=1}^{K} \log(p(k))q(k).$$

where $p(k)$ is the probability of a label $k$ from a set of $K$ labels as reflected by the label scores generated by the neural network for a particular training item and $q(k)$ is the ground-truth value of each label $k$ from the set of $K$ labels.

As opposed to modifying label data associated with one or more training data labels, the system may alternatively seek to achieve label-smoothing regularization by modifying the cross-entropy loss function as follows:

$$H(q',p) = -\Sigma_{K=1}^{K} \log(p(k))q'(k) = (1-\epsilon)H(q,p) + \epsilon H(u,p)$$

Accordingly, the label-smoothing regularization described above is equivalent to replacing a single cross-entropy loss $H(q,p)$ with a pair of losses that include a first error term in the form of cross entropy loss $H(q,p)$ and a second error term $H(u,p)$. The second error term $H(u,p)$ is referred to as a regularizing error term that penalizes the neural network based on the error calculated between a set of scores generated by the neural network and a smoothing distribution that includes a respective smoothing score for each of the labels in the set. For example, the smoothing distribution may be a uniform distribution $u$ that assigns the same score for each label in the set of labels associated with the smoothing distribution.

At stage 504, the system trains a neural network to minimize the regularizing loss function that includes the first error term and the regularizing error term. Such training may be performed as described with reference to FIG. 1. However, the loss function 130 of system 100 would be replaced by the regularizing loss function.

Embodiments of the subject matter, the functional operations and the processes described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible nonvolatile program carrier for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a standalone program or as a module, component, subroutine, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Computer readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

What is claimed is:

1. A method of training a neural network, wherein the neural network is configured to receive an input data item and to process the input data item to generate a respective score for each label in a predetermined set of multiple labels, the method comprising:

obtaining a plurality of training items, wherein each training item is associated with an initial target label distribution that assigns a respective target score to each label in the predetermined set of multiple labels;

for each training item, modifying the initial target label distribution associated with the training item by combining the initial target label distribution with a smoothing label distribution, wherein the smoothing label distribution includes a respective smoothing score for each label in the predetermined set of multiple labels and is independent of the training item; and training the neural network using the plurality of training items and the respective modified initial target distributions for the plurality of training items.

2. The method of claim 1, wherein combining the initial target label distribution with the smoothing label distribution includes:

calculating a weighted sum of the initial target label distribution and the smoothing label distribution.

3. The method of claim 1, wherein, for each training item:
the target score for a known label for the training item is assigned a predetermined positive value in the initial target label distribution for the training item, and
the target score for each label other than the known label is set to 0 in the initial target label distribution.

4. The method of claim 1, wherein each smoothing score has the same predetermined value.

5. The method of claim 1, wherein the smoothing scores are non-uniform.

6. A system for training a neural network, wherein the neural network is configured to receive an input data item and to process the input data item to generate a respective score for each label in a predetermined set of multiple labels, the system comprising:

one or more data processing apparatus; and
one or more memory devices storing instructions that when executed by the one or more data processing apparatus cause the one or more data processing apparatus to perform operations for training a neural network, wherein the neural network is configured to receive an input data item and to process the input data item to generate a respective score for each label in a predetermined set of multiple labels, the operations including:

obtaining a plurality of training items, wherein each training item is associated with an initial target label distribution that assigns a respective target score to each label in the predetermined set of labels;

for each training item, modifying the initial target label distribution by combining the initial target label distribution with a smoothing label distribution, wherein the smoothing label distribution includes a respective smoothing score for each label in the predetermined set of multiple labels and is independent of the training item; and training the neural network using the plurality of training items and the respective modified initial target distributions for the plurality of training items.

7. The system of claim 6, wherein combining the initial target label distribution with the smoothing label distribution includes:

calculating a weighted sum of the initial target label distribution and the smoothing label distribution.

8. The system of claim 6, wherein, for each training item:
the target score for a known label for the training item is assigned a predetermined positive value in the initial target label distribution for the training item, and
the target score for each label other than the known label is set to 0 in the initial target label distribution.

9. The system of claim 6, wherein each smoothing score has the same predetermined value.

10. The system of claim 6, wherein the smoothing scores are non-uniform.

11. A non-transitory computer-readable medium storing software comprising instructions executable by one or more computers which, upon such execution, cause the one or more computers to perform operations for training a neural network, wherein the neural network is configured to receive an input data item and to process the input data item to generate a respective score for each label in a predetermined set of multiple labels, the operations comprising:

obtaining a plurality of training items, wherein each training item is associated with an initial target label distribution that assigns a respective target score to each label in the predetermined set of labels;

for each training item, modifying the initial target label distribution by combining the initial target label distribution with a smoothing label distribution, wherein the smoothing label distribution includes a respective smoothing score for each label in the predetermined set of multiple labels and is independent of the training item; and training the neural network using the plurality of training items and the respective modified initial target distributions for the plurality of training items.

12. The non-transitory computer-readable medium of claim 11, wherein combining the initial target label distribution with the smoothing label distribution includes:

calculating a weighted sum of the initial target label distribution and the smoothing label distribution.

13. The non-transitory computer-readable medium of claim 11, wherein, for each training item:
the target score for a known label for the training item is assigned a predetermined positive value in the initial target label distribution for the training item, and
the target score for each label other than the known label is set to 0 in the initial target label distribution.

14. The non-transitory computer-readable medium of claim 11, wherein each smoothing score has the same predetermined value.

15. The non-transitory computer-readable medium of claim 11, wherein the smoothing scores are non-uniform.

16. A method of training a neural network, wherein the neural network is configured to receive an input data item and to process the input data item to generate a respective score for each label in a predetermined set of multiple labels, the method comprising:

obtaining a set of training data that includes a plurality of training items, wherein each training item is associated with a respective label from the predetermined set of multiple labels;

modifying the set of training data, comprising, for each training item:
determining whether or not to modify the label associated with the training item; and
in response to determining to modify the label associated with the training item, changing the label associated with the training item that correctly describes the training item to a different label from the predetermined set of labels that incorrectly describes the training item; and training the neural network on the modified training data.

17. The method of claim 16, wherein the different label is randomly selected from the predetermined set of labels.

18. The method of claim 16, wherein the label includes a training label distribution that includes a score for the training item for each label in a predetermined set of labels associated with a set of training images.

19. The method of claim 18, wherein changing the label associated with the training item to a different label from the predetermined set of labels includes changing the distribution of scores in a training data item's training label distribution from a distribution of scores representing a correct label to a distribution of scores representing an incorrect label.

20. The method of claim 16, wherein determining whether or not to modify the label associated with the training item is based on a predetermined probability.

21. The method of claim 20, wherein the predetermined probability is 10%.

22. A method of training a neural network, wherein the neural network is configured to receive an input data item and to process the input data item to generate a respective score for each label in a predetermined set of multiple labels, the method comprising:

receiving a request to train the neural network to optimize a loss function comprising a first error term; and training the neural network to optimize a regularized loss function, the regularized loss function comprising the first error term and a regularizing error term that penalizes the neural network based on the error between a predicted distribution and a smoothing distribution, wherein:

the predicted distribution is generated by the neural network upon processing a particular data item and includes a respective predicted score for each label in the predetermined set of labels; and the smoothing distribution includes a respective smoothing score for each label in the predetermined set of multiple labels.

23. The method of claim 22, wherein the smoothing distribution is a uniform distribution.

24. The method of claim 22, wherein the smoothing distribution is a distribution that was used prior to the predicted distribution.

\* \* \* \* \*